US011228251B2

(12) United States Patent
Hang et al.

(10) Patent No.: US 11,228,251 B2
(45) Date of Patent: Jan. 18, 2022

(54) HYBRID FIVE-LEVEL BIDIRECTIONAL DC/DC CONVERTER AND VOLTAGE MATCH MODULATION METHOD THEREOF

(71) Applicant: Hangzhou Dianzi University, Hangzhou (CN)

(72) Inventors: Lijun Hang, Hangzhou (CN); Anping Tong, Shanghai (CN); Shenglun Chen, Jinzhai County (CN); Chi Shao, Hangzhou (CN); Yuanbin He, Hangzhou (CN); Lei Shen, Hangzhou (CN); Pingliang Zeng, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 17/114,277

(22) Filed: Dec. 7, 2020

(65) Prior Publication Data
US 2021/0203237 A1 Jul. 1, 2021

(30) Foreign Application Priority Data
Dec. 26, 2019 (CN) .......................... 201911363275.0

(51) Int. Cl.
*H02M 3/335* (2006.01)
*H02M 1/00* (2006.01)
*H02M 7/487* (2007.01)

(52) U.S. Cl.
CPC ......... *H02M 3/33584* (2013.01); *H02M 1/00* (2013.01); *H02M 3/33573* (2021.05);
(Continued)

(58) Field of Classification Search
CPC ......... H02M 3/33584; H02M 3/33573; H02M 1/00; H02M 1/0095; H02M 7/487;
(Continued)

(56) References Cited

U.S. PATENT DOCUMENTS

| 6,058,031 A * | 5/2000 | Lyons | ................... H02M 7/487 |
| | | | 363/132 |
| 9,331,595 B2 * | 5/2016 | Yoo | ....................... H02M 7/483 |

(Continued)

*Primary Examiner* — Yusef A Ahmed
(74) *Attorney, Agent, or Firm* — NZ Carr Law Office PLLC (57) ABSTRACT

The present disclosure discloses a hybrid five-level bidirectional DC/DC converter and a voltage match modulation method thereof. The converter includes a first input filter capacitor $C_{inp}$ and a second input filter capacitor $C_{inn}$, an output filter capacitor $C_o$, a DC voltage source, a primary-side hybrid five-level unit, a primary-side two-level half bridge, a secondary-side single-phase full bridge H2, a high-frequency isolation transformer $M_1$, a high-frequency inductor $L_s$, and a controller. A positive pole of a DC bus of the primary-side hybrid five-level unit is coupled to a positive pole of the corresponding DC voltage source and to a positive pole of the input filter capacitor $C_{inp}$ respectively. A negative pole of the DC bus of the primary-side hybrid five-level unit is coupled to a negative pole of the corresponding DC voltage source and to a negative pole of the input filter capacitor $C_{inn}$ respectively. A terminal of the primary-side hybrid five-level unit is coupled to a midpoint between the first input filter capacitor $C_{inp}$ and the second input filter capacitor $C_{inn}$ connected in series. The primary-side hybrid five-level unit is coupled to a primary side of the high-frequency isolation transformer $M_1$ through the high-frequency inductor $L_s$, and a midpoint of the primary-side two-level half bridge is coupled to another terminal of the primary side of the high-frequency transformer.

7 Claims, 7 Drawing Sheets

(52) U.S. Cl.
CPC ........ *H02M 1/0048* (2021.05); *H02M 1/0095* (2021.05); *H02M 7/487* (2013.01)

(58) Field of Classification Search
CPC .. H02M 1/0048; H02M 1/0064; H02M 3/285; H02M 7/5388; H02M 1/0058; Y02B 70/10
See application file for complete search history.

(56) References Cited

U.S. PATENT DOCUMENTS

| | | | | |
|---|---|---|---|---|
| 9,966,875 | B2* | 5/2018 | Wang | H02M 7/537 |
| 10,673,343 | B1* | 6/2020 | Tong | H02M 1/00 |
| 11,038,436 | B2* | 6/2021 | Ahn | H02M 7/483 |
| 11,063,523 | B2* | 7/2021 | Hu | H02M 1/088 |
| 2014/0097687 | A1* | 4/2014 | Park | H02J 3/385 |
| | | | | 307/43 |
| 2015/0155770 | A1* | 6/2015 | Ying | H02M 7/4837 |
| | | | | 307/52 |
| 2015/0200602 | A1* | 7/2015 | Narimani | H02M 5/4585 |
| | | | | 363/37 |
| 2016/0028224 | A1* | 1/2016 | Yamada | H02H 9/02 |
| | | | | 363/56.11 |
| 2016/0352251 | A1* | 12/2016 | Li | H02M 7/487 |
| 2017/0012552 | A1* | 1/2017 | Gan | H02M 7/12 |
| 2017/0104424 | A1* | 4/2017 | Shen | H02M 7/4837 |
| 2017/0229972 | A1* | 8/2017 | Cerqueira Pinto Bezerra Varaj O | H02M 7/797 |
| 2018/0062537 | A1* | 3/2018 | Wang | H02J 3/383 |
| 2018/0159519 | A1* | 6/2018 | Chen | H02M 1/08 |
| 2018/0309384 | A1* | 10/2018 | Wang | H02M 7/487 |
| 2019/0207526 | A1* | 7/2019 | Sanada | H02M 3/28 |
| 2019/0238062 | A1* | 8/2019 | Lu | H03K 17/122 |
| 2019/0363644 | A1* | 11/2019 | Li | H02M 7/49 |
| 2020/0007022 | A1* | 1/2020 | De Doncker | H02M 3/3376 |
| 2020/0007030 | A1* | 1/2020 | De Doncker | H02M 3/33592 |
| 2020/0321878 | A1* | 10/2020 | Zhang | H02M 3/01 |
| 2020/0412238 | A1* | 12/2020 | Zhu | H02M 1/4233 |
| 2021/0067057 | A1* | 3/2021 | Abarzadeh | H02M 7/49 |

* cited by examiner

HYBRID FIVE-LEVEL BIDIRECTIONAL DC/DC CONVERTER AND VOLTAGE MATCH MODULATION METHOD THEREOF

CROSS REFERENCE

This application is based upon and claims priority to Chinese Patent Application No. 201911363275.0, filed on Dec. 26, 2019, the entire contents thereof are incorporated herein by reference.

TECHNICAL FIELD

The present disclosure relates to the field of DC/DC high-frequency isolation conversion technologies, and more particularly, to a hybrid five-level bidirectional DC/DC converter and a voltage match modulation method thereof.

BACKGROUND

A dual active bridge-isolated bidirectional DC/DC converter (DAB) based on phase shift control technologies has the advantages such as high power density, fast dynamic response, easy implementation of soft switching, and bidirectional power flow, and thus is widely popular in the fields of uninterruptible power supplies, electric vehicles, and solid state transformers, etc. The phase shift control is a common DAB converter control mode. A two-level or multi-level voltage square wave with a relative phase shift is generated at a primary-side port and a secondary-side port of a high-frequency transformer. In the meanwhile, by regulating the relative phase shift between the primary-side square wave and the secondary-side square wave and a duty ratio of each level, the power flowing through the converter is regulated and the waveform of the current flowing through the high-frequency transformer is controlled.

In a conventional two-level DAB converter, commonly used modulation modes include: single phase shift modulation (SPSM), dual phase shift modulation (DPSM), extended phase shift modulation (EPSM), and triple phase shift modulation (TPSM), etc. Having three independent control variables, the TPSM serves as the most flexible modulation mode for the two-level DAB converter. For the two-level DAB converter, when the voltage transmission ratio is approximate to 1, that is, when an input/output voltage is approximately matched, an effective value of the current and a current stress are smaller, a soft switching range is wider, and a transmission efficiency is higher. The voltage transmission ratio is calculated by multiplying the output voltage by the transformation ratio and dividing by the input voltage. When a port voltage of the converter changes within a large range, for example, when the voltage of a vehicle-mounted power battery sometimes may vary within a wide range of 200V~450V, in such an application scenario, even if an optimized TPSM modulation technology is employed, the two-level DAB converter still has larger current stress and larger RMS(root mean square) value of the current in some working regions, then the energy transmission efficiency is low, and the converter still needs to be further improved in comprehensive performance.

To ensure the converter to adapt to an ultra-wide port voltage range, the hybrid five-level bidirectional converter may be additionally equipped with a five-level unit so as to obtain extra intermediate levels, for which duty ratios may be independently regulated, one quarter of the input voltage, one half of the input voltage, and three-quarters of the input voltage respectively. When the voltage transmission ratio is in the range of one quarter to one, the duty ratios of the intermediate levels may be optimized such that the converter can work in the state of approximate voltage match, which can significantly reduce the current stress and the RMS value of the current during operation, improve the conversion efficiency of input/output power within the entire voltage range and power range, and implement global optimization operation.

SUMMARY OF THE INVENTION

In view of the abovementioned technical problems, the present disclosure provides a hybrid five-level bidirectional DC/DC converter and a voltage match modulation method thereof. The hybrid five-level bidirectional DC/DC converter has a topological structure, which can adapt to workplaces where port voltage has an ultra-wide range variation, can efficiently reduce the RMS value of current and a current stress for an isolation transformer in the converter, and can improve an operation performance of the DAB.

To solve the aforementioned technical problems, the present disclosure adopts following technical solutions.

An aspect of the present disclosure provides a hybrid five-level bidirectional DC/DC converter, which includes a first input filter capacitor $C_{inp}$ and a second input filter capacitor $C_{inn}$, an output filter capacitor $C_o$, a DC voltage source, a primary-side hybrid five-level unit, a primary-side two-level half bridge, a secondary-side single-phase full bridge $H_2$, a high-frequency isolation transformer $M_1$, a high-frequency inductor $L_s$, and a controller, meanwhile, a positive pole of a DC bus of the primary-side hybrid five-level unit is coupled to a positive pole of the corresponding DC voltage source and to a positive pole of the input filter capacitor $C_{inp}$ respectively. A negative pole of the DC bus of the primary-side hybrid five-level unit is coupled to a negative pole of the corresponding DC voltage source and to a negative pole of the input filter capacitor $C_{inn}$ respectively. A terminal of the primary-side hybrid five-level unit is coupled to a midpoint between the first input filter capacitor $C_{inp}$ and the second input filter capacitor $C_{inn}$ connected in series. The primary-side hybrid five-level unit is coupled to a primary side of the high-frequency isolation transformer $M_1$ through the high-frequency inductor $L_s$, and a midpoint of the primary-side two-level half bridge is coupled to another terminal of the primary side of the high-frequency transformer;

a positive pole of a DC bus of the secondary-side single-phase full bridge $H_2$ is coupled to a positive pole of a corresponding DC load and to a positive pole of the output filter capacitor $C_o$ respectively. A negative pole of the DC bus of the secondary-side single-phase full bridge $H_2$ is coupled to a negative pole of the corresponding DC load and to a negative pole of the output filter capacitor $C_o$ respectively, and an AC side of the secondary-side single-phase full bridge $H_2$ is coupled to a secondary side of the high-frequency isolation transformer.

an input terminal of a control signal of the primary-side hybrid five-level unit, an input terminal of a control signal of the primary-side two-level half bridge, and an input terminal of a control signal of the secondary-side single-phase full bridge are respectively coupled to an output terminal of a switch signal corresponding to the controller.

Preferably, a transformation ratio of the high-frequency isolation transformer $M_1$ is N:1.

Preferably, nine levels are produced by an AC port voltage $v_p$ of the primary-side five-level unit:

$$\pm v_{in}, \pm \frac{3v_{in}}{4}, \pm \frac{v_{in}}{2}, \pm \frac{v_{in}}{4}$$

and 0, wherein $v_{in}$ represents an input DC voltage of the hybrid five-level bidirectional DC/DC converter. An AC port voltage $v_s$ of the secondary-side single-phase full bridge $H_2$ produces three levels as follows: $\pm v_{out}$ and 0, wherein $v_{out}$ represents an output voltage of the hybrid five-level bidirectional DC/DC converter.

Preferably, the controller includes a sampling unit, a PI controller, and a modulation unit, wherein, the sampling unit includes two signal input terminals, and the two signal input terminals respectively measure the input voltage $v_{in}$ and the output voltage $v_{out}$.

the PI controller uses an error obtained by comparing the output voltage $v_{out}$ and a reference voltage $v_{ref}$ thereof as an input, and uses an output x obtained after being processed by the PI controller as a modulation signal.

the modulation unit uses the input voltage vim, the output voltage $v_{out}$, the reference voltage $v_{ref}$ and the output x as input signals, and obtains a voltage transmission ratio F and a drive signal of each switch based on the input voltage $v_{in}$, the output voltage $v_{out}$, and the transformation ratio N of the high-frequency isolation transformer.

Another aspect of the present disclosure provides a voltage match modulation method for the aforementioned hybrid five-level bidirectional DC/DC converter, including:

setting a PI controller parameter of a controller, specifically, setting a proportionality coefficient $k_p$ and an integration coefficient $k_i$ for the controller, and calculating an output x of the PI controller to serve as a modulation signal;

outputting the voltage transmission ratio F and the output x of the PI controller respectively to a modulation unit of the controller to calculate a control variable; and driving, based on the control variable, a fully-controlled switch device of the primary-side hybrid five-level unit, a fully-controlled switch device of the primary-side two-level half bridge, and a fully-controlled switch device of the secondary-side single-phase full bridge to control actions of the fully-controlled switch devices to implement optimized operation.

Preferably, the voltage transmission ratio F is:

$$F = \frac{Nv_{out}}{v_{in}}$$

wherein the transformation ratio N of the high-frequency isolation transformer serves as an initial value presetting.

Preferably, the output x of the PI controller is:

$$x = k_p(v_{ref} - v_{out}) + k_i \int (v_{ref} - v_{out}) dt$$

wherein $0.1 \leq k_p \leq 10$, $0.001 \leq k_i \leq 1$, $v_{ref}$ represents a reference voltage; and the output x of the PI controller ranges from −0.5 to 1.

Preferably, the number of the control variable is six: $D_{p0}$, $D_{p2}$, $D_{p3}$, $D_{p4}$, $D_{s0}$, and $D_{ss}$; wherein, $D_{p0}$ controls a zero level of the primary-side hybrid five-level unit;

$D_{p2}$ controls a ½ level of the primary-side hybrid five-level unit;

$D_{p3}$ controls a ¾ level of the primary-side hybrid five-level unit;

$D_{p4}$ controls a $\pm v_{in}$ level of the primary-side hybrid five-level unit;

$D_{s0}$ controls a zero level of the secondary-side single-phase full bridge $H_2$; and $D_{ss}$ controls a relative phase shift between the primary-side hybrid five-level unit and the secondary-side single-phase full bridge $H_2$.

Preferably, the step of calculating the control variable includes:

classifying, based on a value of the voltage transmission ratio F, the converter into five operation conditions to calculate six control variables:

in the first operation condition, $0 < F < ¼$, specifically, $4 \times Nv_{out} < v_{in}$, calculation of each control variable being as follows:

$D_{ss} = x$ $D_{s0} = 0$ $D_{p4} = 0$ $D_{p3} = 0$ $D_{p2} = 0$ $D_{p0} = 1 - 4F$ in the second operation condition, $¼ < F < ½$, specifically, $v_{in} < 4 \times Nv_{out} < 2v_{in}$, calculation of each control variable being as follows:

$D_{ss} = x$ $D_{s0} = 0$ $D_{p4} = 0$ $D_{p3} = 0$ $D_{p2} = 4F - 1$ $D_{p0} = 0$ in the third operation condition, $½ < F < ¾$ specifically, $2v_{in} < 4 \times Nv_{out} < 3v_{in}$, calculation of each control variable being as follows:

$D_{ss} = x$ $D_{s0} = 0$ $D_{p4} = 0$ $D_{p3} = 4F - 2$ $D_{p2} = 3 - 4F$ $D_{p0} = 0$ in the fourth operation condition, $¾ < F < 1$, specifically, $3v_{in} < 4 \times Nv_{out} < 4v_{in}$, calculation of each control variable being as follows:

$D_{ss} = x$ $D_{s0} = 0$ $D_{p4} = 4F - 3$ $D_{p3} = 4(1 - F)$ $D_{p2} = 0$ $D_{p0} = 0$ in the fifth operation condition, 1<F, specifically, $v_{in}<Nv_{out}$, calculation of each control variable being as follows: and $$D_{ss} = x$$
$$D_{s0} = 1 - \frac{1}{F}$$
$$D_{p4} = 0$$
$$D_{p3} = 0$$
$$D_{p2} = 0$$
$$D_{p0} = 0$$

based on the aforementioned modulation method, following equation is satisfied such that an input/output voltage is approximately matched;

$$\int_0^{t5} v_p(t)dt = \int_0^{t5} Nv_s(t)dt$$

wherein $v_p$ represents an AC port voltage of the primary-side five-level unit, and $v_s$ represents an AC port voltage of the secondary-side single-phase full bridge $H_2$.

Preferably, the modulation unit is set based on:

a duty ratio $D_{p0}$ of the zero level of the primary-side five-level unit;

a duty ratio $D_{p2}$ of the ½ level of the primary-side five-level unit;

a duty ratio $D_{p3}$ of the ¾ level of the primary-side five-level unit;

a duty ratio $D_{p4}$ of the $\pm v_{in}$ level of the primary-side five-level unit;

a duty ratio $D_{s0}$ of the zero level of the secondary-side single-phase full bridge $H_2$; and a relative phase shift $D_{ss}$ between the primary-side five-level unit and the secondary-side single-phase full bridge $H_2$.

A drive signal pulse is inputted in chronological order, and the fully-controlled switch device of the hybrid five-level unit and the fully-controlled switch device of the primary-side two-level half bridge $H_2$ are controlled to complete a modulation process.

Adoption of the present disclosure has the following beneficial effects.

(1) According to the hybrid five-level bidirectional DC/DC converter and the voltage match modulation method thereof provided by the present disclosure, compared with a full five-level bidirectional DC/DC scheme, the hybrid five-level scheme may reduce the number of semiconductor devices, reduce costs, and enhance system reliability.

(2) According to the hybrid five-level bidirectional DC/DC converter and the voltage match modulation method thereof provided by the present disclosure, a control objective is to reduce the RMS value of the current flowing through the isolation transformer of the DAB converter, to reduce system loss and improve the power conversion efficiency.

(3) According to the hybrid five-level bidirectional DC/DC converter and the voltage match modulation method thereof provided by the present disclosure, six-degree-of-freedom global optimization control is implemented based on six control variables as follows: a duty ratio of the zero level of the primary side of the hybrid five-level bidirectional DC/DC converter; a duty ratio of a high level of the primary side, a duty ratio of the ½ level of the primary side, a duty ratio of the ¾ level of the primary side, a duty ratio of the zero level of the secondary side, and a relative phase shift between the primary side and the secondary side. By coordinating the six control variables of the converter, the RMS value of the current is reduced, and the operation efficiency of the converter is improved.

(4) According to the hybrid five-level bidirectional DC/DC converter and the voltage match modulation method thereof provided by the present disclosure, a voltage range of an input/output side may be increased, a conduction loss may be reduced, and an energy conversion efficiency within an ultra-wide voltage range may be improved.

DETAILED DESCRIPTION OF THE EMBODIMENTS

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by those of ordinary skills in the art based on the embodiments of the present disclosure without creative efforts shall fall within the protection scope of the present disclosure.

Figure 1:
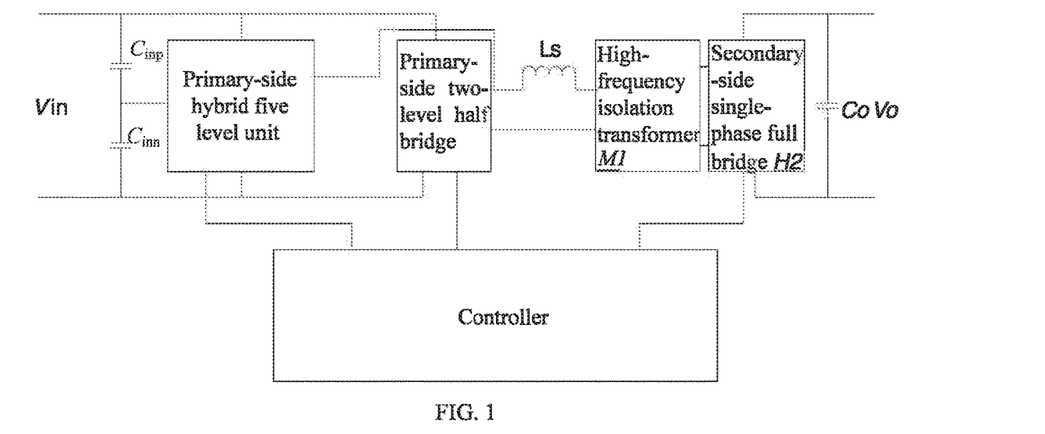
FIG. 1 is a schematic block diagram of a hybrid five-level bidirectional DC/DC converter according to an embodiment of the present disclosure.

As shown in FIG. 1, a hybrid five-level bidirectional DC/DC converter provided by an embodiment of the present disclosure includes a first input filter capacitor $C_{inp}$ and a second input filter capacitor $C_{inn}$, an output filter capacitor $C_o$, a DC voltage source, a primary-side hybrid five-level unit, a primary-side two-level half bridge, a secondary-side single-phase full bridge $H_2$, a high-frequency isolation transformer $M_1$, a high-frequency inductor $L_s$, and a controller. A positive pole of a DC bus of the primary-side hybrid five-level unit is coupled to a positive pole of the corresponding DC voltage source and to a positive pole of the input filter capacitor $C_{inp}$ respectively. A negative pole of the DC bus of the primary-side hybrid five-level unit is coupled to a negative pole of the corresponding DC voltage source and to a negative pole of the input filter capacitor $C_{inn}$ respectively. A terminal of the primary-side hybrid five-level unit is coupled to a midpoint between the first input filter capacitor $C_{inp}$ and the second input filter capacitor $C_{inn}$ connected in series. The primary-side hybrid five-level unit is coupled to a primary side of the high-frequency isolation transformer $M_1$ through the high-frequency inductor $L_s$, and a midpoint of the primary-side two-level half bridge is coupled to another terminal of the primary side of the high-frequency transformer. A positive pole of a DC bus of the secondary-side single-phase full bridge $H_2$ is coupled to a positive pole of a corresponding DC load and to a positive pole of the output filter capacitor $C_o$ respectively. A negative pole of the DC bus of the secondary-side single-phase full bridge $H_2$ is coupled to a negative pole of the corresponding DC load and to a negative pole of the output filter capacitor $C_o$ respectively, and an AC side of the secondary-side single-phase full bridge $H_2$ is coupled to a secondary side of the high-frequency isolation transformer. An input terminal of a control signal of the primary-side hybrid five-level unit, an input terminal of a control signal of the primary-side two-level half bridge, and an input terminal of a control signal of the secondary-side single-phase full bridge are respectively coupled to an output terminal of a switch signal corresponding to the controller.

Figure 2:
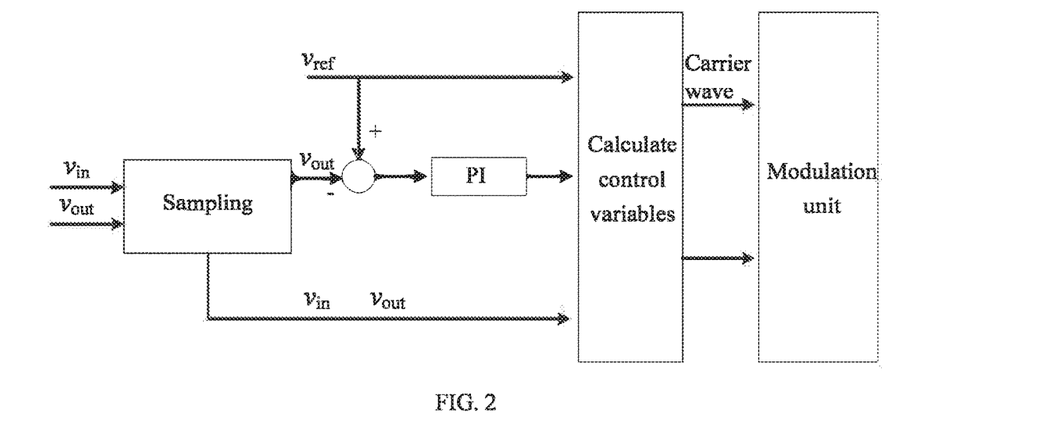
FIG. 2 is a schematic block diagram of a controller of the hybrid five-level bidirectional DC/DC converter according to an embodiment of the present disclosure.

Further, referring to FIG. 2, the controller includes a sampling unit, a PI controller, and a modulation unit. The sampling unit includes two signal input terminals, and the two signal input terminals respectively measure the input voltage $v_{in}$ and the output voltage $v_{out}$. The PI controller uses an error obtained by comparing the output voltage $v_{out}$ and a reference voltage $v_{ref}$ thereof as an input, and uses an output x obtained after being processed by the PI controller as a modulation signal. The modulation unit uses the input voltage $v_{in}$, the output voltage $v_{out}$, the reference voltage $v_{ref}$ and the output x as input signals, and obtains a voltage transmission ratio F and a drive signal of each switch based on the input voltage $v_{in}$, the output voltage $v_{out}$, and the transformation ratio N of the high-frequency isolation transformer.

Figure 3:
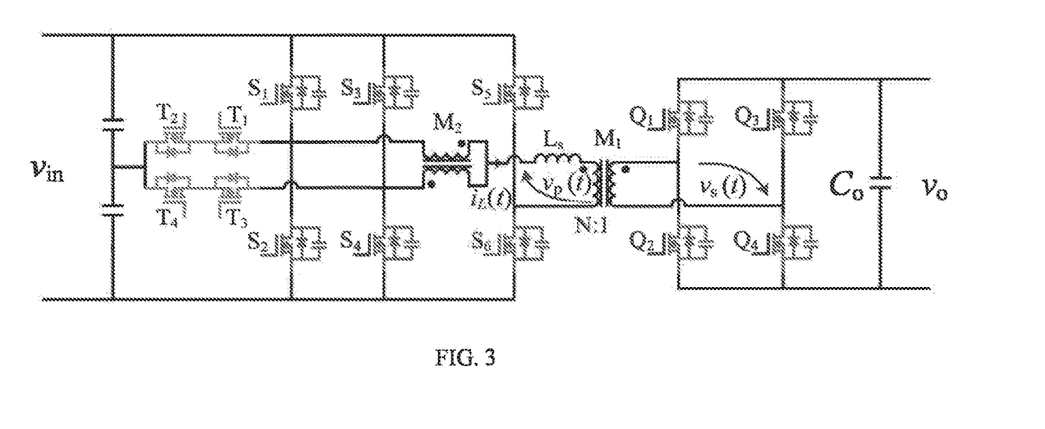
FIG. 3 is a circuit topological structure diagram in an application example of the hybrid five-level bidirectional DC/DC converter according to an embodiment of the present disclosure.
Figure 4:
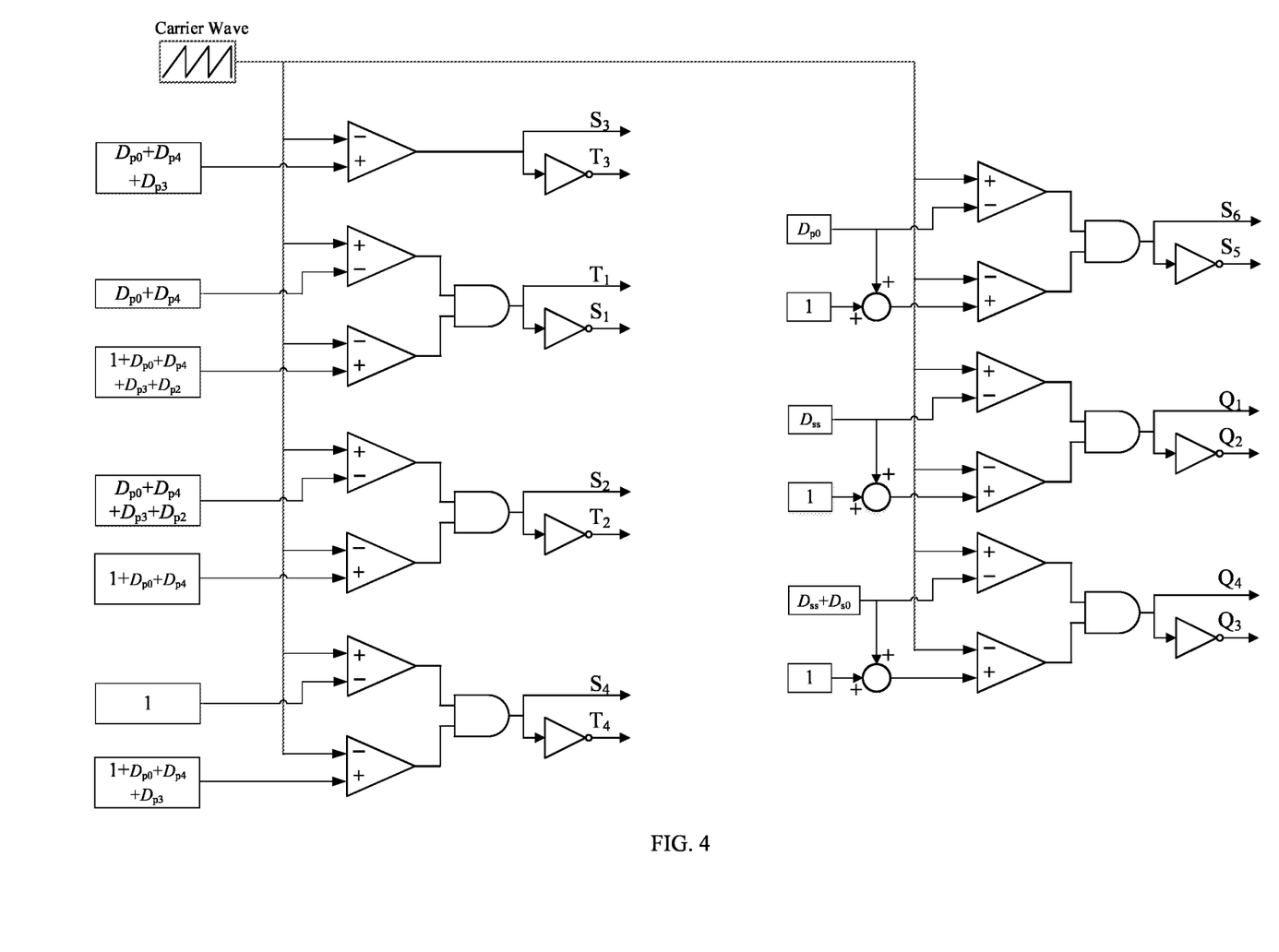
FIG. 4 is a diagram showing an implementation manner of a switch signal corresponding to the controller of the hybrid five-level bidirectional DC/DC converter according to an embodiment of the present disclosure.
Figure 5:
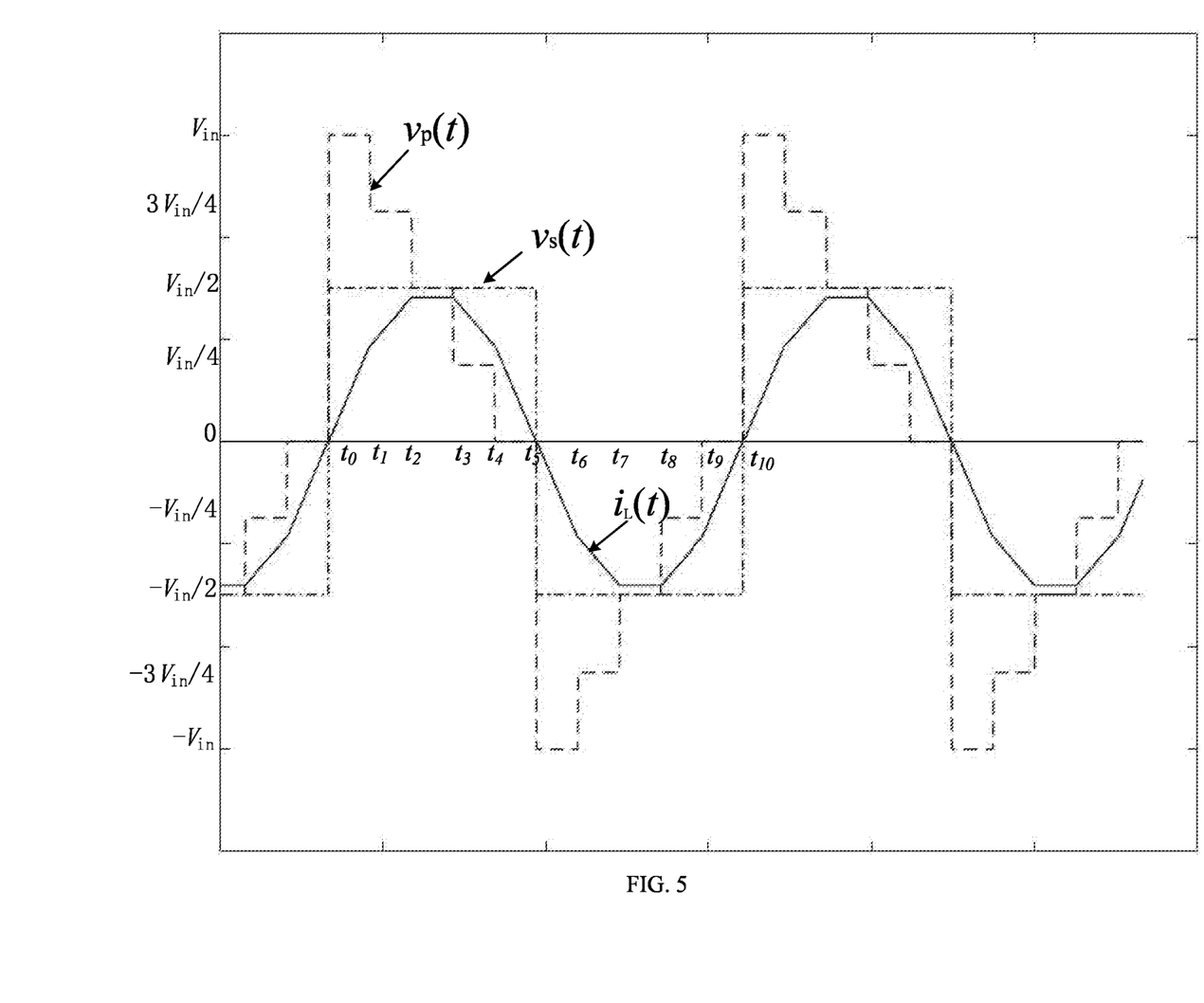
FIG. 5 is a typical waveform diagram of AC voltage and current of a primary side and a secondary side of the hybrid five-level bidirectional DC/DC converter according to an embodiment of the present disclosure.

In a specific application example, referring to FIG. 3, fully-controlled switch devices $T_1 \sim T_4$ and $S_1 \sim S_4$ and an autotransformer $M_2$ constitute a primary-side hybrid five-level unit, and fully-controlled switch devices $S_5$ and $S_6$ constitute a two-level half bridge. The secondary-side single-phase full bridge $H_2$ includes fully-controlled switch devices $Q_1 \sim Q_4$. A positive pole of a DC bus of the primary-side hybrid five-level unit is coupled to a positive pole of the corresponding DC voltage source and to a positive pole of the input filter capacitor $C_{inp}$ respectively, and a negative pole of the DC bus of the primary-side hybrid five-level unit is coupled to a negative pole of the corresponding DC voltage source and to a negative pole of the input filter capacitor $C_{inn}$ respectively. A terminal of the fully-controlled switch devices $T_1 \sim T_4$ is coupled to a midpoint between the first input filter capacitor $C_{inp}$ and the second input filter capacitor $C_{inn}$ connected in series, and another terminal of the fully-controlled switch devices $T_1 \sim T_4$ is coupled to two terminals of the autotransformer $M_2$. A center tap of the autotransformer $M_2$ is coupled to a primary side of the high-frequency isolation transformer through the high-frequency inductor $L_s$. A midpoint of the two-level half bridge constituted by the fully-controlled switch devices $S_5$ and $S_6$ is coupled to another terminal of the primary side of the high-frequency isolation transformer. A positive pole of a DC bus of the secondary-side single-phase full bridge $H_2$ is coupled to a positive pole of a corresponding DC load and to a positive pole of the output filter capacitor $C_o$ respectively, a negative pole of the DC bus of the secondary-side single-phase full bridge $H_2$ is coupled to a negative pole of the corresponding DC load and to a negative pole of the output filter capacitor $C_o$ respectively, and an AC side of the secondary-side single-phase full bridge $H_2$ is coupled to a secondary side of the high-frequency isolation transformer. An input terminal of a control signal of the fully-controlled switch devices $S_1 \sim S_6$ and $T_1 \sim T_4$ and an input terminal of a control signal of the fully-controlled switch devices $Q_1 \sim Q_4$ are respectively coupled to an output terminal of a switch signal corresponding to the controller. FIG. 4 and FIG. 5 respectively show an implementation manner of a switch signal corresponding to the controller of the hybrid five-level bidirectional DC/DC converter and a waveform diagram of AC voltage and current of a primary side and a secondary side of the hybrid five-level bidirectional DC/DC converter in this embodiment. As can be seen from FIG. 5, an AC port voltage $v_p$ of the primary-side hybrid five-level unit can produce nine levels:

$$\pm v_{in}, \pm \frac{v_{in}}{4}, \pm \frac{v_{in}}{2}, \pm \frac{3v_{in}}{4},$$

and 0; and an AC port voltage $v_s$ of the secondary-side single-phase full bridge $H_2$ produces three levels: $\pm v_{out}$ and 0. A duty ratio of the zero level of the primary-side five-level unit is $D_{p0}$; a duty ratio of the ½ level of the primary-side five-level unit is $D_{p2}$; a duty ratio of the ¾ level of the primary-side five-level unit is $D_{p3}$; a duty ratio of the $\pm v_{in}$ level of the primary-side five-level unit is $D_{p4}$; a duty ratio of the zero level of the secondary-side single-phase full bridge $H_2$ is $D_{s0}$; and a relative phase shift between the primary-side five-level unit and the secondary-side single-phase full bridge $H_2$ is $D_{ss}$.

According to another embodiment of the present disclosure, a voltage match modulation method for the above hybrid five-level bidirectional DC/DC converter includes following steps:

setting a PI controller parameter of a controller, specifically, setting a proportionality coefficient $k_p$ and an integration coefficient $k_i$ for the controller, and calculating an output x of the PI controller to serve as a modulation signal;

outputting the voltage transmission ratio F and the output x of the PI controller respectively to a modulation unit of the controller to calculate a control variable; and driving, based on the control variable, a fully-controlled switch device of the primary-side hybrid five-level unit, a fully-controlled switch device of the primary-side two-level half bridge, and a fully-controlled switch device of the secondary-side single-phase full bridge to control actions of the fully-controlled switch devices to implement optimized operation.

In a further preferred embodiment, the voltage transmission ratio F is:

$$F = \frac{Nv_{out}}{v_{in}}$$

wherein the transformation ratio N of the high-frequency isolation transformer serves as an initial value presetting.

In a further preferred embodiment, the output x of the PI controller is:

$$x = k_p(v_{ref} - v_{out}) + k_i \int (v_{ref} - v_{out}) dt$$

wherein $0.1 \leq k_p \leq 10$, $0.001 \leq k_i \leq 1$, $v_{ref}$ represents a reference voltage; and the output x of the PI controller ranges from −0.5 to 1.

Specifically, an optimized control strategy provided by this example includes:

calculating the control variable; and classifying, based on a value of the voltage transmission ratio F, the hybrid five-level bidirectional DC/DC converter of the embodiments of the present disclosure into five operation conditions to calculate six control variables to satisfy the following conditions:

in the first operation condition, $0<F<\frac{1}{4}$, specifically, $4 \times Nv_{out} < v_{in}$, calculation of each control variable is as follows:

$$D_{ss}=x$$
$$D_{s0}=0$$
$$D_{p4}=0$$
$$D_{p3}=0$$
$$D_{p2}=0$$
$$D_{p0}=1-4F$$

in the second operation condition, $\frac{1}{4}<F<\frac{1}{2}$, specifically, $v_{in}<4 \times Nv_{out}<2v_{in}$, calculation of each control variable is as follows:

$$D_{ss}=x$$
$$D_{s0}=0$$
$$D_{p4}=0$$
$$D_{p3}=0$$
$$D_{p2}=4F-1$$
$$D_{p0}=0$$

in the third operation condition, $\frac{1}{2}<F<\frac{3}{4}$, specifically, $2v_{in}<4 \times Nv_{out}<3v_{in}$, calculation of each control variable is as follows:

$$D_{ss}=x$$
$$D_{s0}=0$$
$$D_{p4}=0$$
$$D_{p3}=4F-2$$
$$D_{p2}=3-4F$$
$$D_{p0}=0$$

in the fourth operation condition, $\frac{3}{4}<F<1$, specifically, $3v_{in}<4 \times Nv_{out}<4v_{in}$, calculation of each control variable is as follows: and $$D_{ss}=x$$
$$D_{s0}=0$$
$$D_{p4}=4F-3$$
$$D_{p3}=4(1-F)$$
$$D_{p2}=0$$
$$D_{p0}=0$$

in the fifth operation condition, $1<F$, specifically, $v_{in}<Nv_{out}$, calculation of each control variable is as follows:

$$D_{ss}=x$$
$$D_{s0}=1-\frac{1}{F}$$
$$D_{p4}=0$$
$$D_{p3}=0$$
$$D_{p2}=0$$
$$D_{p0}=0$$

Figure 6:
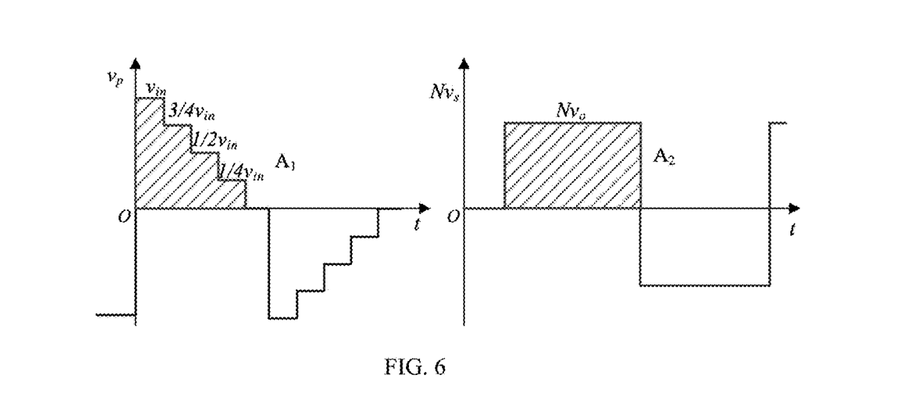
FIG. 6 is a schematic diagram showing voltage match control according to an embodiment of the present disclosure.

Through the above modulation method, the following condition may be satisfied to approximately match an input/output voltage: allowing areas of two shaded portions in FIG. 6 to be equal, $S_{A1}=S_{A2}$, that is, $\int_0^{t_s} v_p(t)dt = \int_0^{t_s} Nv_s(t)dt$, wherein $v_p$ represents an AC port voltage of the primary-side five-level unit, and $v_s$ represents an AC port voltage of the secondary-side single-phase full bridge $H_2$.

The modulation unit is set based on: a duty ratio $D_{p0}$ of the zero level of the primary-side five-level unit; a duty ratio $D_{p2}$ of the ½ level of the primary-side five-level unit; a duty ratio $D_{p3}$ of the ¾ level of the primary-side five-level unit; a duty ratio $D_{p4}$ of the $\pm v_{in}$ level of the primary-side five-level unit; a duty ratio $D_{s0}$ of the zero level of the secondary-side single-phase full bridge $H_2$; and a relative phase shift $D_{ss}$ between the primary-side five-level unit and the secondary-side single-phase full bridge $H_2$. A drive signal pulse is inputted in chronological order, and the fully-controlled switch device of the hybrid five-level unit and the fully-controlled switch device of the primary-side two-level half bridge $H_2$ are controlled to complete a modulation process.

A hybrid five-level dual active bridge topology generally adopts PWM+phase shift control, which may be divided into 10 switching modes. Because the working waveform of the converter is half-cycle symmetrical, working conditions of each switching mode are as follows, and the waveform diagram is as shown in FIG. 5.

Figure 7:
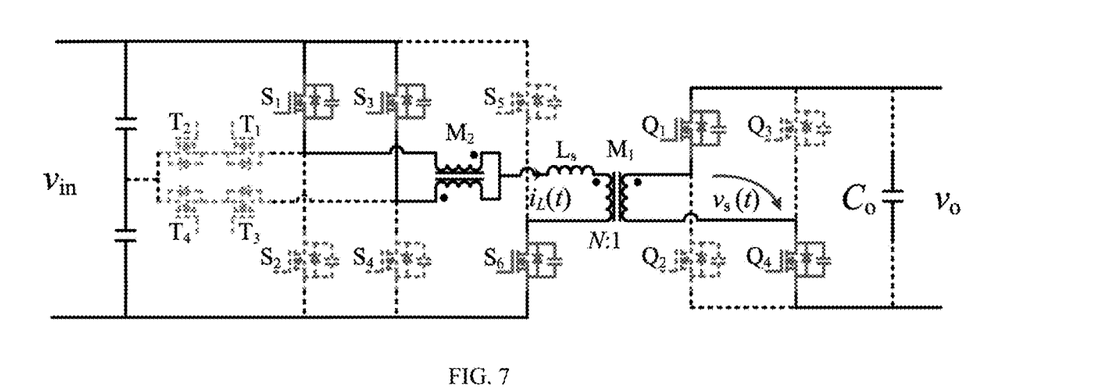
FIG. 7-FIG. 16 are schematic diagrams showing modal operations of each switch of the hybrid five-level bidirectional DC/DC converter according to an embodiment of the present disclosure.

Switching mode 1 $[t_0, t_1]$, as shown in FIG. 7, in the $t_0$–$t_1$ stage, switch transistors $S_1$, $S_3$ and $S_6$ are enabled, secondary-side devices $Q_1$ and $Q_4$ are enabled, $v_p=v_{in}$, $v_s=Nv_{out}$, the inductive current rises linearly, and a rate of rise of the current is the largest.

Figure 8:
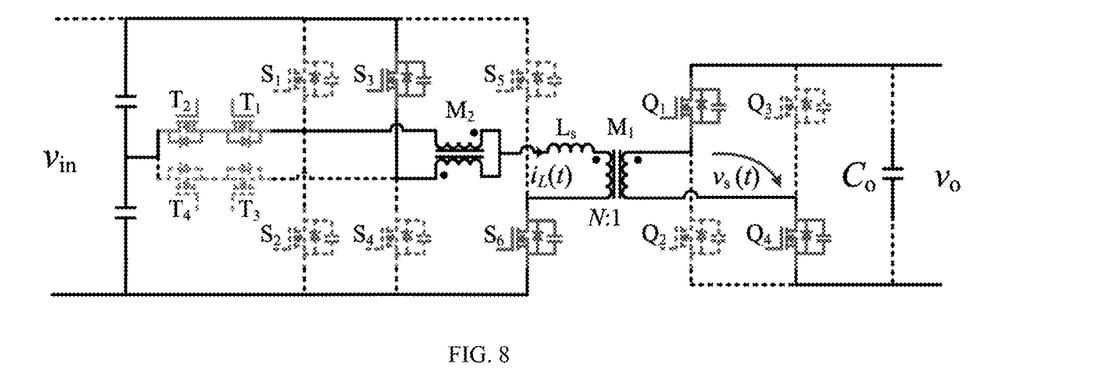

Switching mode 2 $[t_1, t_2]$, as shown in FIG. 8, at the moment of $t_1$, the switch transistor $S_1$ is disabled, the fully-controlled switch devices $T_1$ and $T_2$ are enabled, the secondary-side devices $Q_1$ and $Q_4$ are enabled, and during this period of time, the voltage across the transformer is: $v_p=\frac{3}{4}v_{in}$, $v_s=Nv_{out}$, the inductive current continues to increase, and the rate of rise of the current decreases.

Figure 9:
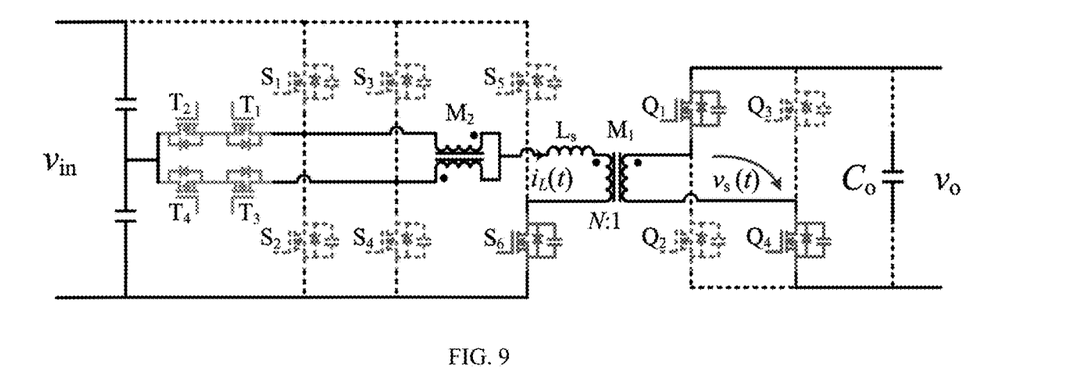

Switching mode 3 $[t_2, t_3]$, as shown in FIG. 9, at the moment of $t_2$, the switch transistor $S_3$ is disabled, the fully-controlled switch devices $T_3$ and $T_4$ are enabled, the secondary-side devices $Q_1$ and $Q_4$ are enabled, and during this period of time, the voltage across the transformer is: $v_p=\frac{1}{2}v_{in}$, $v_s=Nv_{out}$, the rate of change of the inductive current is determined by $\frac{1}{2}v_{in}-Nv_{out}$.

Figure 10:
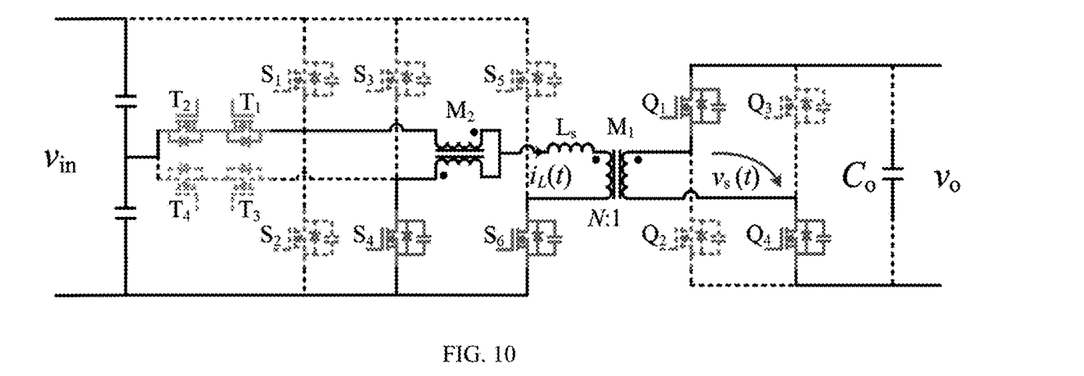

Switching mode 4 $[t_3, t_4]$, as shown in FIG. 10, at the moment of $t_3$, the fully-controlled switch devices $T_3$ and $T_4$ are disabled, the switch transistor $S_4$ is enabled, the secondary-side devices $Q_1$ and $Q_4$ are enabled, and during this period of time, the voltage across the transformer is: $v_p=\frac{1}{4}v_{in}$, $v_s=Nv_{out}$, and the inductive current decreases linearly.

Figure 11:
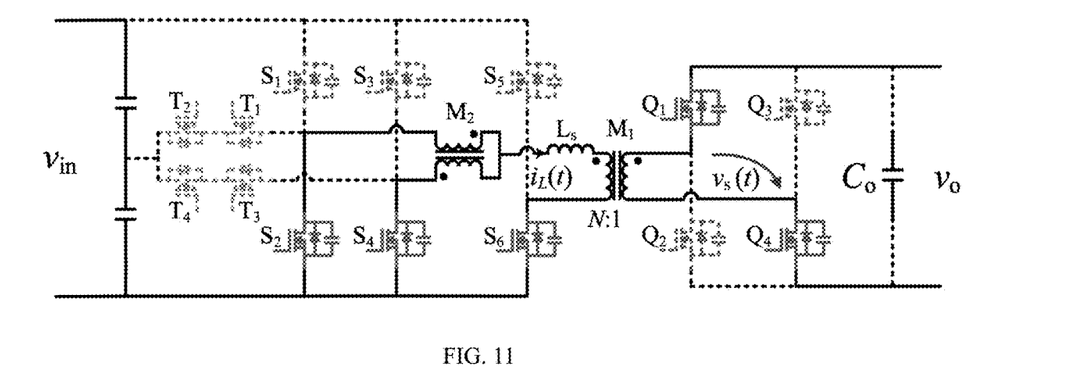

Switching mode 5 [$t_4$, $t_5$], as shown in FIG. 11, at the moment of $t_4$, the fully-controlled switch devices $T_1$ and $T_2$ are disabled, the switch transistor $S_2$ is enabled, the secondary-side devices $Q_1$ and $Q_4$ are enabled, and during this period of time, the voltage across the transformer is: $v_p=0$, $v_s=Nv_{out}$, and the inductive current decreases linearly.

Figure 12:
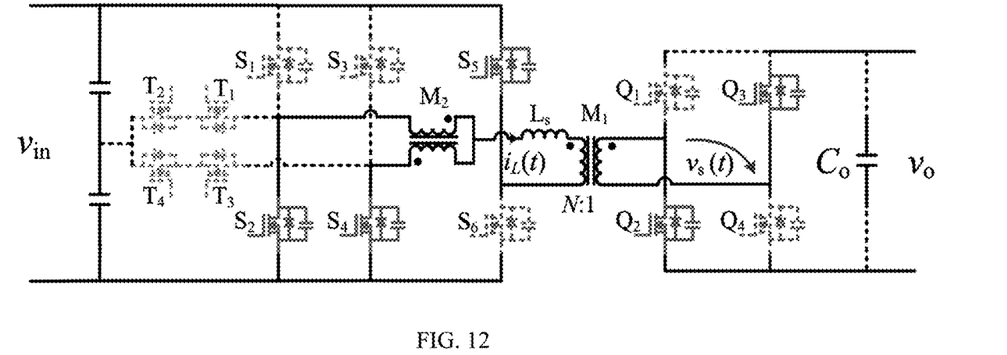

Switching mode 6 [$t_5$, $t_6$], as shown in FIG. 12, in the $t_5$-$t_6$ stage, switch transistors $S_2$, $S_4$ and $S_5$ are enabled, secondary-side devices $Q_2$ and $Q_3$ are enabled, $v_p=-v_{in}$, $v_s=-NV_{out}$, an absolute value of the inductive current rises linearly, and the rate of rise of the current is the largest.

Figure 13:
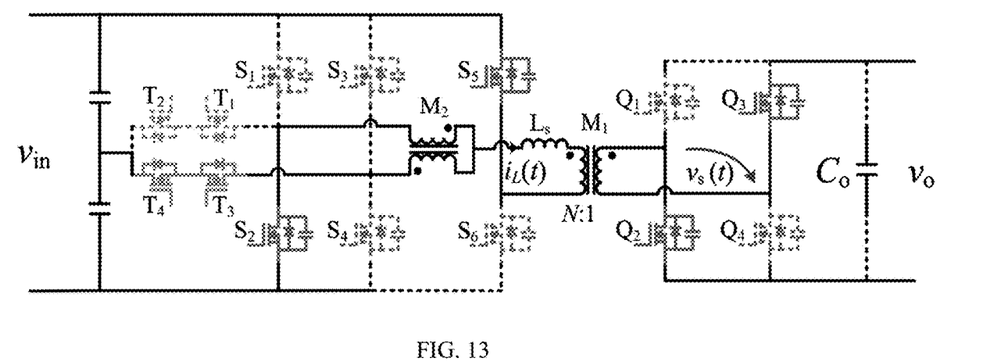

Switching mode 7 [$t_6$, $t_7$], as shown in FIG. 13, at the moment of $t_6$, the switch transistor $S_4$ is disabled, the fully-controlled switch devices $T_3$ and $T_4$ are enabled, the secondary-side devices $Q_2$ and $Q_3$ are enabled, and during this period of time, the voltage across the transformer is: $v_p=-¾v_{in}$, $v_s=-Nv_{out}$, the absolute value of the inductive current continues to increase, and the rate of rise of the current decreases.

Figure 14:
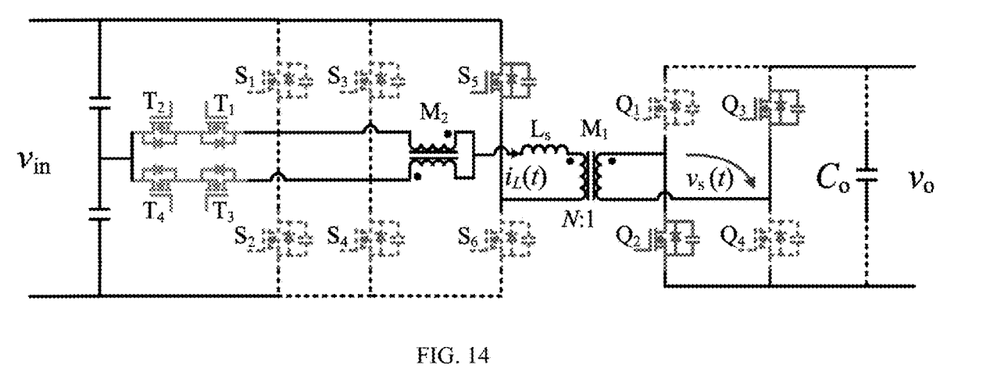

Switching mode 8 [$t_7$, $t_5$], as shown in FIG. 14, at the moment of $t_7$, the switch transistor $S_2$ is disabled, the fully-controlled switch devices $T_1$ and $T_2$ are enabled, the secondary-side devices $Q_2$ and $Q_3$ are enabled, and during this period of time, the voltage across the transformer is: $v_p=-½v_{in}$, $v_s=-Nv_{out}$, and the rate of change of the inductive current is determined by $-½v_{in}+Nv_{out}$.

Figure 15:
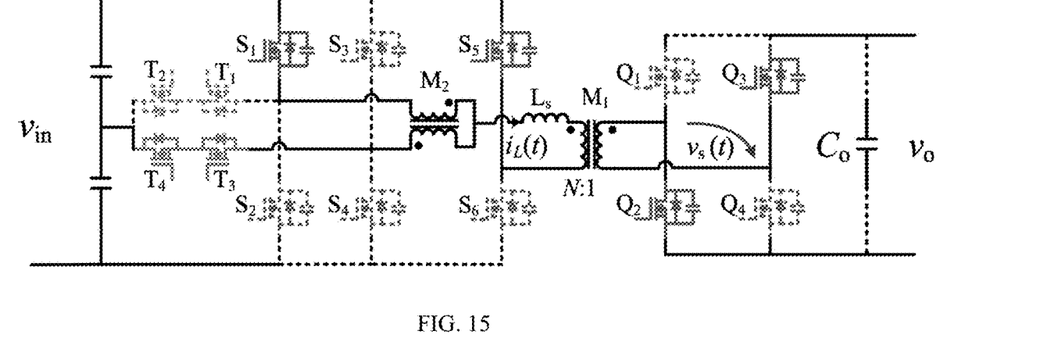

Switching mode 9 [$t_5$, $t_9$], as shown in FIG. 15, at the moment of $t_5$, the fully-controlled switch devices $T_1$ and $T_2$ are disabled, the switch transistor $S_1$ is enabled, the secondary-side devices $Q_2$ and $Q_3$ are enabled, and during this period of time, the voltage across the transformer is: $v_p=-¼v_{in}$, $v_s=-Nv_{out}$, and the absolute value of the inductive current decreases linearly.

Figure 16:
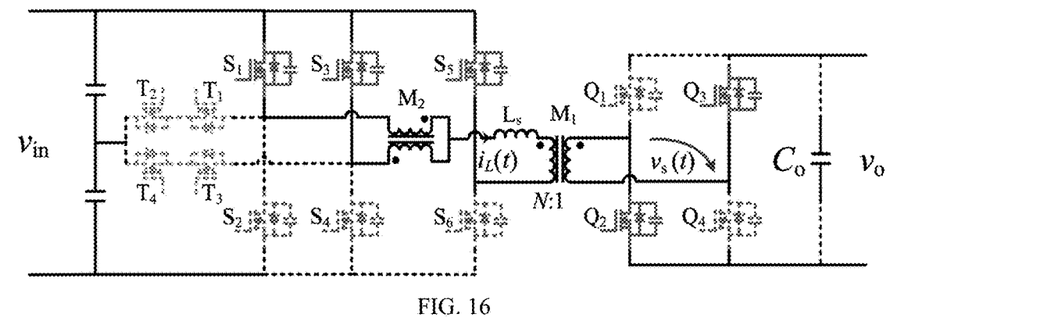

Switching mode 10 [$t_9$, $t_{10}$], as shown in FIG. 16, at the moment of $t_9$, the fully-controlled switch devices $T_3$ and $T_4$ are disabled, the switch transistor $S_3$ is enabled, the secondary-side devices $Q_2$ and $Q_3$ are enabled, and during this period of time, the voltage across the transformer is: $v_p=0$, $v_s=-Nv_{out}$, and the absolute value of the inductive current decreases linearly.

According to the hybrid five-level bidirectional DC/DC converter and the voltage match modulation method thereof provided by the present disclosure, six-degree-of-freedom global optimization control is implemented based on six control variables as follows: a duty ratio of the zero level of the primary side of the hybrid five-level bidirectional DC/DC converter; a duty ratio of a high level of the primary side, a duty ratio of the ½ level of the primary side, a duty ratio of the ¾ level of the primary side, a duty ratio of the zero level of the secondary side, and a relative phase shift between the primary side and the secondary side. By coordinating the six control variables of the converter, the RMS value of the current is reduced, and the operation efficiency of the converter is improved. Furthermore, a voltage range of an input/output side may be increased, a conduction loss may be reduced, and an energy conversion efficiency within an ultra-wide voltage range may be improved.

In a specific application example, each parameter may be preferably selected as follows: the voltage transmission ratio F=0.5, the input voltage $v_{in}$=400V, the output voltage $v_{out}$=200V, a switching frequency $f_s$=200 kHz, an AC inductance $L_s$=20 μH, the transformer transformation ratio N=1, the output filter capacitor $C_o$=100 μF, and the input filter capacitors $C_{inp}$=40 μF and $C_{inn}$=40 μF.

It is to be appreciated that the exemplary embodiments set forth herein are illustrative rather than restrictive. Although one or more embodiments of the present disclosure are described with reference to the accompanying drawings, those of ordinary skill in the art should understand that various changes in form and details may be made without departing from the spirit and scope of the present disclosure as defined by the appended claims.

What is claimed is:

1. A hybrid five-level bidirectional DC/DC converter, comprising a first input filter capacitor $C_{inp}$, and a second input filter capacitor $C_{inn}$, an output filter capacitor $C_o$, a DC voltage source, a primary-side hybrid five-level unit, a primary-side two-level half bridge, a secondary-side single-phase full bridge $H_2$, a high-frequency isolation transformer $M_1$, a high-frequency inductor $L_s$ and a controller; wherein
   a positive pole of a DC bus of the primary-side hybrid five-level unit is coupled to a positive pole of the DC voltage source and to a positive pole of the input filter capacitor $C_{inp}$ respectively, a negative pole of the DC bus of the primary-side hybrid five-level unit is coupled to a negative pole of the DC voltage source and to a negative pole of the input filter capacitor $C_{inn}$ respectively, a terminal of the primary-side hybrid five-level unit is coupled to a midpoint between the first input filter capacitor $C_{inp}$ and the second input filter capacitor $C_{inn}$ connected in series, the primary-side hybrid five-level unit is coupled to a primary side of the high-frequency isolation transformer $M_1$ through the high-frequency inductor $L_s$ and a midpoint of the primary-side two-level half bridge is coupled to another terminal of the primary side of the high-frequency isolation transformer, wherein a transformation ratio of the high-frequency isolation transformer $M_1$ is N:1;
   a positive pole of a DC bus of the secondary-side single-phase full bridge $H_2$ is coupled to a positive pole of a corresponding DC load and to a positive pole of the output filter capacitor $C_o$ respectively, a negative pole of the DC bus of the secondary-side single-phase full bridge $H_2$ is coupled to a negative pole of the corresponding DC load and to a negative pole of the output filter capacitor $C_o$ respectively, and an AC side of the secondary-side single-phase full bridge $H_2$ is coupled to a secondary side of the high-frequency isolation transformer; and
   an input terminal of a control signal of the primary-side hybrid five-level unit, an input terminal of a control signal of the primary-side two-level half bridge, and an input terminal of a control signal of the secondary-side single-phase full bridge are respectively coupled to an output terminal of a switch signal corresponding to the controller,
   wherein nine levels are produced by an AC port voltage $v_p$ of the primary-side five-level unit:

$$\pm v_{in},\ \pm\frac{3v_{in}}{4},\ \pm\frac{v_{in}}{2},\ \pm\frac{v_{in}}{4}$$

and 0, wherein $v_{in}$ represents an input DC voltage of the hybrid five-level bidirectional DC/DC converter; and an AC port voltage $v_s$ of the secondary-side single-phase full bridge $H_2$ produces three levels as follows: $\pm V_{out}$ and 0, wherein $v_{out}$ represents an output voltage of the hybrid five-level bidirectional DC/DC converter,
   wherein the controller comprises a sampling unit, a PI controller, and a modulation unit, wherein the sampling unit comprises two signal input terminals, and the two signal input terminals respectively measure the input voltage $v_{in}$ and the output voltage $v_{out}$;

the PI controller uses an error obtained by comparing the output voltage $v_{out}$ and a reference voltage $v_{ref}$ thereof as an input, and uses an output x obtained after being processed by the PI controller as a modulation signal; and the modulation unit uses the input voltage $v_{in}$, the output voltage $v_{out}$, the reference voltage $v_{ref}$ and the output x as input signals, and obtains a voltage transmission ratio F and drive signals based on the input voltage $v_{in}$, the output voltage $v_{out}$, and the transformation ratio N of the high-frequency isolation transformer.

2. A voltage match modulation method for the hybrid five-level bidirectional DC/DC converter according to claim 1, comprising:

setting a PI controller parameter of the controller, specifically, setting a proportionality coefficient $k_p$ and an integration coefficient $k_i$, for the controller, and calculating the output x of the PI controller to serve as the modulation signal;

outputting the voltage transmission ratio F and the output x of the PI controller respectively to the modulation unit of the controller to calculate a control variable; and driving, based on the control variable, a fully-controlled switch device of the primary-side hybrid five-level unit, a fully-controlled switch device of the primary-side two-level half bridge, and a fully-controlled switch device of the secondary-side single-phase full bridge to control actions of the fully-controlled switch devices to implement optimized operation.

3. The voltage match modulation method according to claim 2, wherein the voltage transmission ratio F is:

$$F = \frac{Nv_{out}}{v_{in}}$$

wherein the transformation ratio N of the high-frequency isolation transformer serves as an initial value presetting.

4. The voltage match modulation method according to claim 2, wherein the output x of the PI controller is:

$$x = k_p(v_{ref} - v_{out}) + k_i \int (v_{ref} - v_{out}) dt$$

wherein $0.1 \leq k_p \leq 10$, $0.001 \leq k_i \leq 1$, $v_{ref}$ represents a reference voltage; and the output x of the PI controller ranges from −0.5 to 1.

5. The voltage match modulation method according to claim 2, wherein the number of the control variable is six: $D_{p0}$, $D_{p2}$, $D_{p3}$, $D_{p4}$, $D_{s0}$, and $D_{ss}$; wherein $D_{p0}$ controls a zero level of the primary-side hybrid five-level unit;

$D_{p2}$ controls a ½ level of the primary-side hybrid five-level unit;

$D_{p3}$ controls a ¾ level of the primary-side hybrid five-level unit;

$D_{p4}$ controls a ±$v_{in}$ level of the primary-side hybrid five-level unit;

$D_{s0}$ controls a zero level of the secondary-side single-phase full bridge $H_2$; and $D_{ss}$ controls a phase shift between the primary-side hybrid five-level unit and the secondary-side single-phase full bridge $H_2$.

6. The voltage match modulation method according to claim 5, wherein the step of calculating the control variable comprises:

classifying, based on a value of the voltage transmission ratio F, the converter into five operation conditions to calculate six control variables:

in the first operation condition, $0 < F < ¼$, specifically, $4 \times Nv_{out} < v_{in}$, calculation of each control variable being as follows:

$D_{ss} = x$ $D_{s0} = 0$ $D_{p4} = 0$ $D_{p3} = 0$ $D_{p2} = 0$ $D_{p0} = 1 - 4F$ in the second operation condition, $¼ < F < ½$, specifically, $v_{in} < 4 \times Nv_{out} < 2v_{in}$, calculation of each control variable is as follows:

$D_{ss} = x$ $D_{s0} = 0$ $D_{p4} = 0$ $D_{p3} = 0$ $D_{p2} = 4F - 1$ $D_{p0} = 0$ in the third operation condition, $½ < F < ¾$, specifically, $2v_{in} < 4 \times Nv_{out} < 3v_{in}$, calculation of each control variable is as follows:

$D_{ss} = x$ $D_{s0} = 0$ $D_{p4} = 0$ $D_{p3} = 4F - 2$ $D_{p2} = 3 - 4F$ $D_{p0} = 0$ in the fourth operation condition, $¾ < F < 1$, specifically, $3v_{in} < 4 \times Nv_{out} < 4v_{in}$, calculation of each control variable is as follows: and $D_{ss} = x$ $D_{s0} = 0$ $D_{p4} = 4F - 3$ $D_{p3} = 4(1 - F)$ $D_{p2} = 0$ $D_{p0} = 0$ in the fifth operation condition, $1 < F$, specifically, $v_{in} < Nv_{out}$, calculation of each control variable is as follows:

$$D_{ss} = x$$
$$D_{s0} = 1 - \frac{1}{F}$$
$$D_{p4} = 0$$
$$D_{p3} = 0$$
$$D_{p2} = 0$$
$$D_{p0} = 0$$

based on the aforementioned modulation method, following equation is satisfied:

$$\int_0^{t_5} v_p(t)dt = \int_0^{t_5} N v_s(t)dt$$

wherein $v_p$ represents an AC port voltage of the primary-side five-level unit, and $v_s$ represents an AC port voltage of the secondary-side single-phase full bridge $H_2$.

7. The voltage match modulation method according to claim 6, wherein the modulation unit is set based on:
- a duty ratio $D_{p0}$ of the zero level of the primary-side five-level unit;
- a duty ratio $D_{p2}$ of the ½ level of the primary-side five-level unit;
- a duty ratio $D_{p3}$ of the ¾ level of the primary-side five-level unit;
- a duty ratio $D_{p4}$ of the $\pm v_{in}$ level of the primary-side five-level unit;
- a duty ratio $D_{s0}$ of the zero level of the secondary-side single-phase full bridge $H_2$; and
- the phase shift $D_{ss}$ between the primary-side five-level unit and the secondary-side single-phase full bridge $H_2$; wherein
- a drive signal pulse is inputted in chronological order, and the fully-controlled switch device of the primary-side hybrid five-level unit and the fully-controlled switch device of the primary-side two-level half bridge $H_2$ are controlled to complete a modulation process.

\* \* \* \* \*